March 27, 1962  J. M. HOLADAY  3,026,531
NEOPRENE GLOVE
Filed May 24, 1960

INVENTOR.
JOSEPH M. HOLADAY
BY
ATTY.

3,026,531
NEOPRENE GLOVE
Joseph M. Holaday, Belmont, Mass., assignor to The B. F. Goodrich Company, New York, N.Y., a corporation of New York
Filed May 24, 1960, Ser. No. 31,397
8 Claims. (Cl. 2—167)

This invention is pertinent to the manufacture of rubber gloves, and has particular reference to a light-weight, durable and flexible lined neoprene rubber glove.

It is customary for workmen to protect their hands against the deteriorative effects of harmful chemical materials by wearing rubber gloves which are impervious to the chemical material being handled. Most such rubber gloves are provided with a cloth lining which serves not only to increase the durability of the glove but also supplies a medium for absorbing perspiration when the glove is worn thereby eliminating the clammy sensation experienced by the wearer when unlined rubber gloves are used. The fabrication of the rubber glove is accomplished by drawing the glove lining which previously has been fashioned into the appropriate glove shape over a glove form and coating the exposed surface of the glove lining with a deposit of rubber. Usually, the rubber deposit is formed by a dipping process which involves immersing the glove form with the glove liner drawn thereupon into an appropriately compounded latex. Several techniques for congealing the latex immediately adjacent the glove form in order to deposit a layer of rubber onto the glove lining are available and, since they all are well known in the art, they will not be discussed in detail herein. The form with the unfinished glove thereupon then is withdrawn from the latex, and the rubber deposit is dried and vulcanized in any convenient manner such as by subjecting the glove while still on the form to a vulcanizing heat. The vulcanized glove then is stripped from the form.

Usually, rubber gloves in which the rubber constituent of the glove is natural rubber are satisfactory and such gloves have been used extensively for handling chemicals. However, when chemical materials which objectionably attack natural rubber are being handled, gloves made of a rubbery material not subject to excessive attack by the chemical material must be employed. Chloroprene rubbers (commonly referred to as neoprene rubbers) are resistant to most chemical materials. Consequently, neoprene rubber gloves have proven particularly suitable for handling chemical susbtances which excessively attack natural rubber.

Heretofore, it has been customary to employ a closely woven Canton flannel cotton lining in neoprene gloves because neoprene latex usually will penetrate through the lighter weight looser woven or knit fabrics if used as the glove liner material. Such penetration or "strike-through" of the latex through the fabric liner of the glove results in the formation of an undesirably stiff glove which is considered to be unsatisfactory by most workmen who must wear rubber gloves. In addition, the penetration of latex through the fabric glove liner during the dipping operation is undesirable in that it impedes the stripping of the finished glove from the glove form. It will be readily appreciated that if a lighter weight fabric of looser weave could be employed as the liner material for neoprene rubber gloves, a product of even greater flexibility and lesser weight would be produced than the neoprene rubber gloves heretofore available.

The present invention provides a lined neoprene rubber glove having greater flexibility than lined neoprene rubber gloves heretofore offered. In accordance with this invention, a light weight fabric of supple weave is employed as the glove liner. Over this liner is applied a coating from a mixture of neoprene rubber latex and natural rubber latex blended together within prescribed proportions. A final or finish coating of neoprene rubber then is deposited over the previously deposited coating to provide an exterior surface of neoprene rubber and the coatings are vulcanized.

The invention will be more fully understood by referring to the following detailed description of the invention and by referring to the drawing in which.

Figure 1:
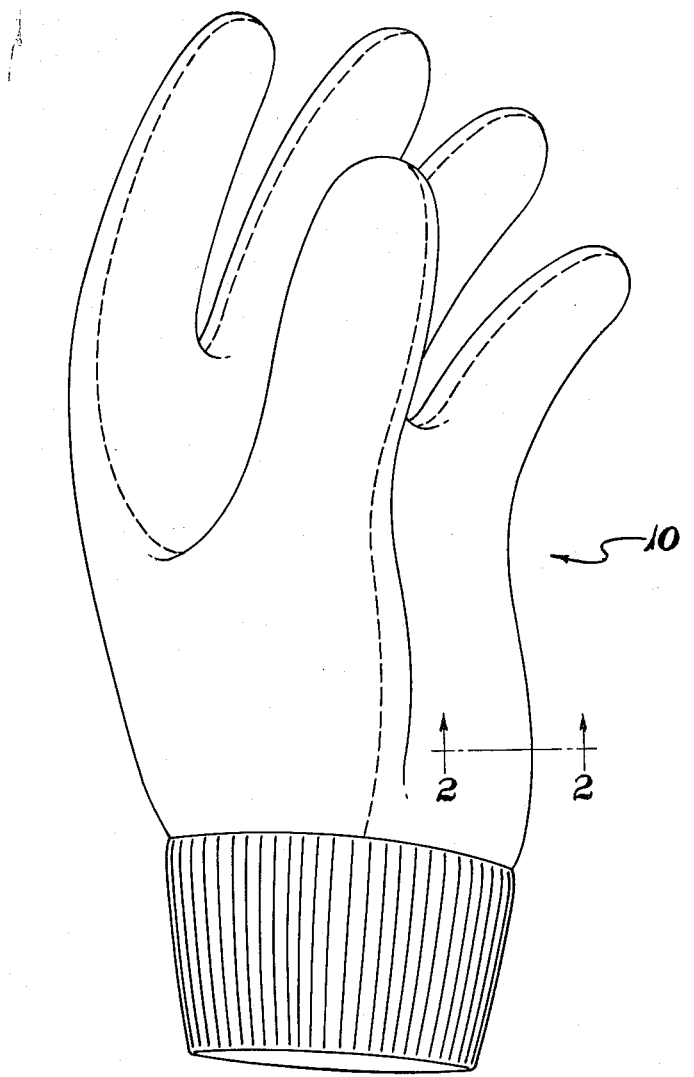
FIG. 1 is a perspective view of a glove embodying this invention.
Figure 2:
FIG. 2 is a section on the line 2—2 of FIG. 1.

Referring to the drawing, glove 10 comprises a glove lining 11 over which is deposited a layer 12 of rubber containing a blend of natural rubber and neoprene rubber within the proportions hereinafter specified. A finish layer 13 composed of a neoprene rubber composition is disposed over base coat 12 and is vulcanized thereto whereby layers 12 and 13 appear to be a unitary layer of rubber.

To provide a neoprene rubber glove of the desired flexibility, a light-weight fabric is employed as the lining material in place of the closely-woven Canton flannel cotton lining previously used. As used herein, the term "light-weight fabric" means 6 to 8 oz. weight knitted fabrics and 6 to 7 oz. weight woven fabrics. Due to the nature of the weave, the maximum weight woven fabric which can be used as the lining material to obtain the desired flexibility is less than the maximum weight knitted fabric which can be employed satisfactorily. (The weight of the fabric is expressed as the weight per square yard of fabric.) A 6 to 8 oz. weight Jersey fabric has been found to be particularly suitable as the lining material. In addition, it is desirable to use a fabric which is not highly sized, a fabric containing no more than about 2% size being much preferred over the fabrics containing about 6 or 7% size which have been used customarily in the past. As has been indicated above, the glove lining usually is made into the general contour of the glove before it is pulled over the glove form. Normally, this prefabrication involves stitching together several pieces of lining material cut to an appropriate shape. However, since it has been observed that lined rubber gloves usually fail as a result of the protective rubber layer being worn through and since excessive wear appears to occur at seams of the glove lining positioned in the wearing or work surface of the glove (the area of the glove which would normally be in contact with objects which are being handled by the wearer), a two-piece glove lining formed by sewing together two hand-shaped pieces of lining material along the edges preferably is used. It will be appreciated that the two-piece glove lining will have a seam extending only up one side of the hand, between the fingers and down the other side of the hand (as shown in dot and dash lines in FIG. 1) and that there will be no seam directly beneath the wearing surface of the glove.

In accordance with this invention, the initial deposit of rubber applied to the fabric glove lining 11 is a blend of natural rubber and neoprene (chloroprene) rubber. As has been indicated above, if a glove lining made from a light-weight loosely woven or knit fabric (such as a 6 to 8 oz. weight Jersey fabric) is dipped initially into a neoprene latex composition, the neoprene latex penetrates objectionably through the fabric lining. As a result of this penetration or "strike-through" of the base coat, the finished glove is considered by most workmen to be excessively stiff, hampering them in their operations. Also, the "strike-through" of the initial rubber deposit over the fabric glove lining tends to hinder the stripping of the finished glove from the glove form which at the very least is a source of irritation to the glove manufacturer. In addition to the objections to "strike-through" mentioned above, the penetration of the base coat through the fabric glove lining detracts from the appearance of the glove and, in part, defeats the property of the fabric glove lining of absorbing perspiration from the hands. The penetration of a neoprene latex compound is believed to be due to the unusually low surface tension exhibited by neoprene latices as compared to natural rubber latex. Although the surface tension of natural rubber latex is sufficiently high to essentially prevent "strike-through," it is not possible to employ a natural rubber latex composition to form a base coat over the glove lining, since the subsequent deposit of a neoprene coat over the natural rubber base coat will not adhere tenaciously enough to the natural rubber base coat layer to provide satisfactory glove service. It has been found, however, that if the initial deposit (base coat) is formed by dipping the glove lining into a latex composition containing as the rubber constituent from 15 to 35% by weight (dry) of neoprene rubber with the balance being natural rubber in the form of a natural rubber latex, the base coat does not penetrate through the fabric glove lining sufficiently to be objectionable. In fact, penetration of this initial deposit is so slight that a glove of excellent flexibility is obtained. Also, a deposit from a neoprene latex composition applied directly over the neoprene rubber-natural rubber base coat will adhere so tenaciously to the base coat after the glove has been vulcanized that separation of the two rubber deposits will not occur during the normal life of the glove. Although the operative proportions (dry weight) of neoprene rubber latex to natural rubber latex in the latex composition from which the base coat 12 is formed have been set forth above, for optimum results, the rubber constituent of the base coat composition should contain from 20 to 30% by weight (dry) of neoprene rubber. It will be appreciated, of course, that, if desired, the base coat 12 may be composed of several deposits of the natural rubber latex-neoprene rubber latex composition in order to build-up a thicker layer composed of this composition and/or that the exterior neoprene layer 13 of the glove also may be composed of several deposits of the neoprene rubber latex composition.

In the preparation of the neoprene rubber latex-natural rubber latex composition from which the base coat 12 is formed, the natural rubber latex and the neoprene rubber latex preferably each is compounded separately by adding to the latices compounding materials such as curing agents, antioxidants, accelerators, fillers, etc. The two separately compounded latices then are blended together in the prescribed proportions and thoroughly intermingled. The reason for compounding the neoprene rubber latex and natural rubber latex separately and then co-mingling the compounded latex is due to the fact that the blend is more stable when formulated in this manner than if the neoprene rubber latex and natural rubber latex were blended together before being compounded and then the compounding ingredients were added to the blend of latices.

After base coat 12 and the neoprene rubber layer 13 have been formed over the glove lining 11, the rubber layers are dried, and are vulcanized in a customary manner such as by exposing the unfinished glove to hot air heated to a temperature of about 285 to 300° F. The glove, preferably, remains on the glove form during the vulcanization step so that the finished glove after having been vulcanized and stripped from the glove form nevertheless will retain the general shape of the form.

The following specific embodiment of this invention is merely an illustration of the invention, and it will be understood that the invention is not intended to be limited to this specific illustration.

In accordance with a preferred embodiment of this invention, a two-piece glove lining is formed by stitching together along their peripheries two hand-shaped pieces of a 6½ oz. weight cotton Jersey fabric containing about 1% size. It will be appreciated that the seam of the glove lining, when the glove is worn, will extend along one side of the hand, between the fingers and along the other side of the hand and is removed from the wearing surfaces of the glove. The glove lining then is pulled over a glove form of appropriate shape and the glove form with the glove lining disposed thereupon is dipped into a neoprene rubber latex-natural rubber latex blend composition in which the rubber constituent is composed of from 15 to 35% by weight (on a dry basis) of neoprene rubber, the balance being natural rubber, to deposit a rubber base coating onto the fabric glove liner, and the deposit is dried partially. The glove form is dipped next into a neoprene rubber latex composition to deposit a neoprene rubber coating over the base coat rubber deposit, and then is dipped into an appropriate coagulant for congealing neoprene rubber latex. The glove, while still on the glove form, is heated in an air oven at 285–300° F. for 60–90 minutes to dry the neoprene rubber deposit and to vulcanize both the base coat layer 12 and neoprene coating 13. The finished glove then is stripped from the glove form. In the fabrication of the glove, the following latex formulations may be used.

*Neoprene Rubber Latex Composition*

| Material: | Parts by weight (dry) |
| --- | --- |
| Neoprene rubber latex (type 601–A) | 160.00 |
| Clay | 32.00 |
| Zinc oxide | 8.00 |
| Phenyl-beta-naphthylamine | 3.20 |
| Lithopone | 3.20 |
| Carbon black | 3.20 |
| Sulfur | 1.60 |
| Methyl cellulose | 0.24 |

*Natural Rubber Latex Composition*

| Material: | Parts by weight (dry) |
| --- | --- |
| Natural rubber latex (60% total solids) | 150.00 |
| Stabilizer, potassium hydroxide 0.6-casein 0.6 | 1.20 |
| Sulfur | 2.25 |
| Benzothiazyl disulfide | 0.45 |
| G–808 (Pullman syrup) [butyraldehyde-aniline condensation product (N-phenyl-3, 5 - diethyl - 2 - propyl - 1,2 - dihydropyridine-active ingredient)] | 0.67 |
| Zinc oxide | 15.00 |
| Carbon black | 6.00 |
| Whiting | 30.00 |
| Karaya gum | 0.075 |

In preparing the latex composition for use in forming the base coat 12 over the glove lining, the two formulations described above are separately compounded and a blend of the two compositions is made using an amount of the neoprene rubber latex composition such that the rubber constituent of the blend contains from 15 to 35% by weight (dry) of neoprene rubber. The above-recited neoprene rubber latex composition can be used per se for forming the outer or finish layer 13 of the glove.

It is clear that obvious modifications and variations of this invention may be made without departing from the spirit and scope of the invention as defined in the appended claims.

I claim:

1. A rubber glove comprising a light-weight fabric glove lining, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

2. A rubber glove comprising a light-weight fabric glove lining containing up to 2% size, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

3. A rubber glove comprising a light-weight fabric glove lining, a rubber base coat disposed over said glove lining, the rubber constituent of said base coat being composed of a blend of natural rubber and neoprene rubber, the amount of neoprene rubber in the rubber constituent of the said base coat being from 20 to 30% by weight of the rubber constituent of the said base coat, and a layer of neoprene rubber composition disposed over the said rubber base coat.

4. A rubber glove comprising a 6 to 8 oz. weight knitted fabric glove lining, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

5. A rubber glove comprising a 6 to 7 oz. woven fabric glove lining, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

6. A rubber glove comprising a light-weight cotton Jersey fabric glove lining, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

7. A rubber glove comprising a light-weight fabric glove lining, said glove lining being of two-piece construction comprising two hand-shaped pieces of fabric stitched together at their edges, a rubber base coat disposed over said glove lining, the rubber constituent of said base coat being composed of a blend of natural rubber and neoprene rubber, the amount of neoprene rubber in the rubber constituent of the said base coat being from 15 to 35% by weight of the rubber constituent of the said base coat, and a layer of neoprene rubber composition disposed over the said rubber base coat.

8. The method of making a rubber glove comprising drawing a light-weight fabric glove lining over a glove form, depositing a base coat onto said glove lining from a latex composition comprising a blend of natural rubber latex and neoprene rubber latex, the amount of neoprene rubber in the rubber constituent of the said latex composition being from 15 to 35% by dry weight, the balance of the rubber constituent of the said latex composition being natural rubber, depositing a layer of neoprene rubber composition onto the said base coat, and vulcanizing the assembly.

References Cited in the file of this patent

UNITED STATES PATENTS

| | | |
|---|---|---|
| 1,387,728 | Kramer | Aug. 16, 1921 |
| 1,500,097 | Abraham | July 8, 1924 |
| 1,769,977 | Watkins | July 8, 1930 |
| 2,327,625 | Dickson | Aug. 24, 1943 |
| 2,343,220 | Mason | Feb. 29, 1944 |
| 2,838,759 | Tassie | June 17, 1958 |